Feb. 3, 1953        S. M. LUNA        2,627,222
UTENSIL FOR COOKING TACOS
Filed Sept. 26, 1950
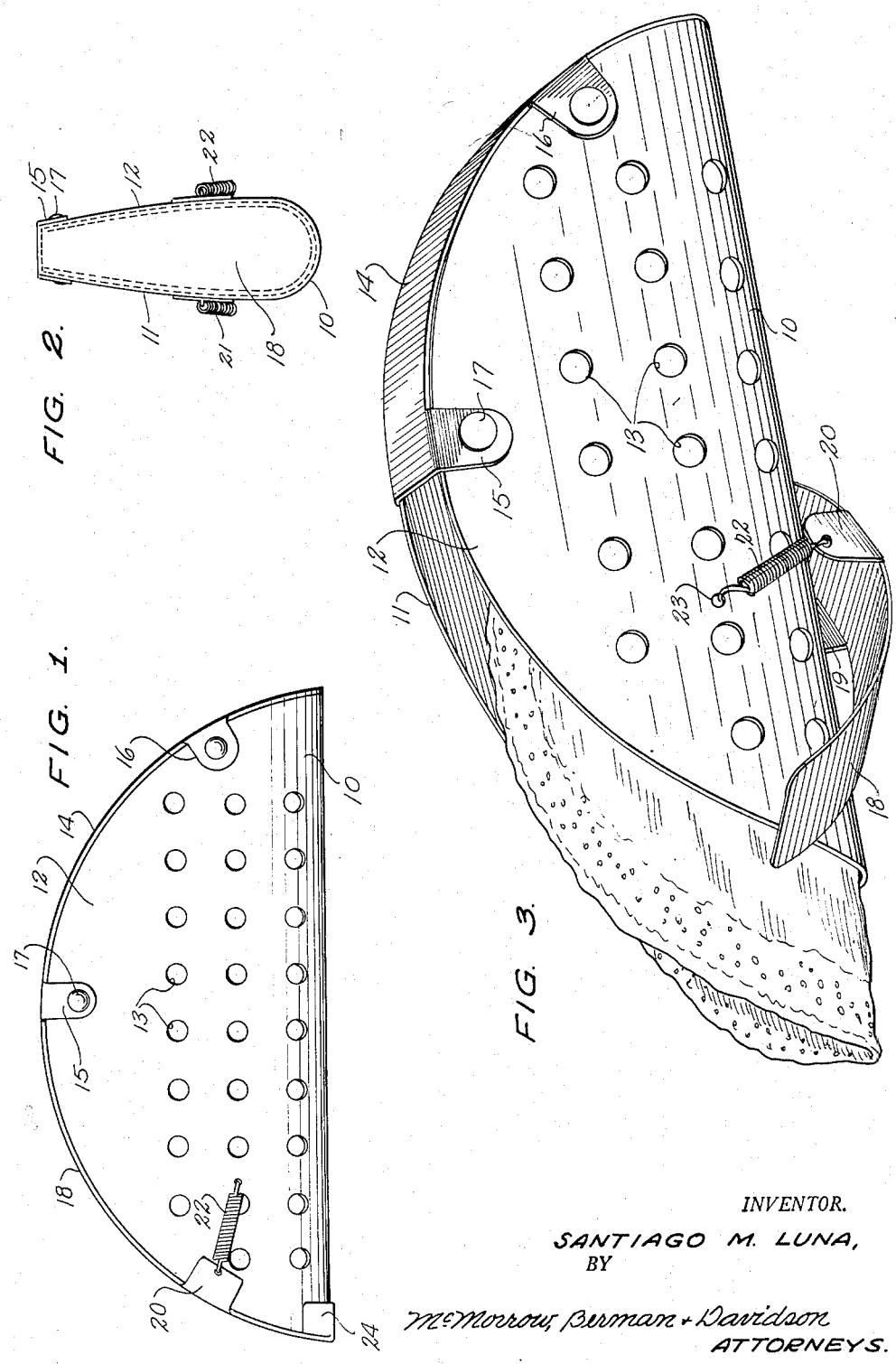
INVENTOR.
SANTIAGO M. LUNA,
BY
McMorrow, Berman + Davidson
ATTORNEYS.

Patented Feb. 3, 1953

2,627,222

UNITED STATES PATENT OFFICE 2,627,222

UTENSIL FOR COOKING TACOS

Santiago M. Luna, Corona, Calif.

Application September 26, 1950, Serial No. 186,787

4 Claims. (Cl. 99—403)

This invention relates to cooking utensils and more particularly to a form or mold for frying tortillas to make tacos.

It is among the objects of the invention to provide an improved utensil into which a flat cake or tortilla in plastic or bendable condition can be easily inserted in folded shape and which will hold the tortilla in evenly folded condition while the cooking is completed, which permits filling the folded cake or tortilla with a filling material and may be completely closed to retain the filling material in place during the subsequent cooking of the tortilla and the filling material to prepare the taco, which is perforated to provide free access of hot grease to the outside of the taco while the latter is being cooked, which is easy to handle and from which the finished taco can be quickly and easily discharged in attractively molded form, and which is simple and durable in construction, economical to manufacture from readily available materials, and effective and efficient in use.

Other objects and advantages will become apparent from a consideration of the following description and the appended claims in conjunction with the accompanying drawing wherein:

Figure 1 is a side elevational view of a utensil illustrative of the invention;

Figure 2 is an end elevational view of the utensil illustrated in Figure 1; and

Figure 3 is a perspective view of the utensil showing the manner of inserting a tortilla therein or removing a taco therefrom.

With continued reference to the drawing, the utensil comprises a body portion 10 formed of a circular piece of sheet material, such as aluminum or stainless steel, of a diameter substantially the same as the diameter of a flat cake or tortilla to be placed therein. This piece of sheet material constitutes the body of the utensil and is bent along a diameter thereof through an angle of approximately 180 degrees and on an arcuate or partly cylindrical curvature so that the two halves of the piece of sheet material, as indicated at 11 and 12 in Figure 3, are spaced apart and mutually opposed with their arcuately curved edges substantially in alignment.

This body 10 is provided with a plurality of substantially uniformly spaced apart apertures 13 which provide for the free access of hot grease or oil to the interior of the body to cook a food article received in the body.

A cover 14 is secured to the body in covering relationship to substantially one half of the space between the curved edges of the halves 11 and 12 extending longitudinally of such curved edges. This cover comprises an elongated rectangular strip of metal, preferably the same metal as that of which the body 10 is formed, of a width sufficient to extend transversely across the space between the curved edges of the halves 11 and 12, and apertured tabs, as indicated at 15 and 16, projecting laterally from the rectangular strip and disposed substantially perpendicular thereto. The tabs 15 and 16 are secured to the body 10 of the utensil by suitable means, such as the rivets 17 so that the cover 14 is permanently and rigidly secured on the body and covers the space between the curved edges of the halves of the body from one end of the body to a location substantially at the mid-length position of such curved edges.

A second cover 18 also comprising a longitudinally curved, rectangular strip of sheet metal, preferably of the same material as that from which the body 10 is formed, is provided to cover the other half of the space between the curved edges of the sides 11 and 12. This strip is provided intermediate its length with apertured tabs 19 and 20 which extend perpendicularly of the strip on the concave side thereof and are secured to the halves 11 and 12 respectively by coiled tension springs 21 and 22, one end of each spring being hooked into the aperture in the corresponding tab and the other end being secured to the body 10 by a corresponding screw or rivet 23.

An arcuately curved flange 24 projects from the concave side of the cover strip 18 at one end of the strip and this flange receives the corresponding end of the body 10 when the cover 18 is placed in covering relationship on the body, as particularly illustrated in Figure 1, to assist in quickly and easily positioning the cover 18 in covering position relative to the body and maintaining this cover in its covering position.

The second cover 18 may be placed in position in which it covers the remaining half of the space between the curved edges of the sides 11 and 12 of the body 10 and is complementary to the cover 14, as illustrated in Figures 1 and 2, or may be moved away from its covering position, as illustrated in Figure 3.

With the cover 18 moved away from its covering position, a partly cooked circular flat cake or tortilla may be placed in the utensil in diametrically folded condition so that the two halves of the cake lie against the corresponding halves 11 and 12 of the body 10 of the utensil. The space within the tortilla may then be filled with a suitable filling material, such as ground meat and a sauce, and the cover 18 placed in covering position to maintain the filling material in place during the remainder of the cooking operation.

The utensil with the material therein is then placed in hot grease and the cooking of the food article, such as a taco, completed. When the cooking has been completed the utensil is removed from the hot grease and the movable cover 18 moved away from its covering position, whereupon the finished taco can be easily discharged from the utensil through the space uncovered by movement of the cover 18.

This utensil gives to the taco a normal appearance such as that produced by the old method of merely folding the tortilla over the filling material, but prevents waste of the filling material and insures a uniformity in the size and shape of the product and in the quantity of material in the articles so produced.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A utensil for cooking tacos comprising a substantially circular body of sheet material arcuately bent along a diameter thereof to a folded condition in which its two halves are spaced apart in mutually opposed relationship, a first cover secured to the halves of said body and closing a part of the space between the curved edges of said halves, and a second cover resiliently secured to the halves of said body and covering the remainder of the space between the curved edges thereof, said second cover being movable from its space covering position for the insertion of a tortilla in folded condition into said body.

2. A utensil for cooking tacos comprising a substantially circular body of sheet material arcuately bent along a diameter thereof to a folded condition in which its two halves are spaced apart in mutually opposed relationship, a first cover secured to the halves of said body and closing a part of the space between the curved edges of said halves, and a second cover resiliently secured to the halves of said body and covering the remainder of the space between the curved edges thereof, said second cover being movable from its space covering position for the insertion of a tortilla in folded condition into said body, and said body having apertures therein for the access of hot grease to a tortilla received in said body.

3. A cooking utensil comprising a body of sheet material having substantially semicircular sides disposed in spaced apart and mutually opposed relationship and joined along their diametrical edges by a partly cylindrical portion of said body, a longitudinally curved cover strip secured to said sides and closing the space between the curved edges of the latter from one end of said body to a location intermediate the length of said curved edges, a second cover strip closing the space between said curved edges from the other end of said body to the adjacent end of the first mentioned cover strip, and resilient means securing said second cover strip to said body for manual removal of said second cover strip from its space closing position.

4. A cooking utensil comprising a body of sheet material having substantially semicircular sides disposed in spaced apart and mutually opposed relationship and joined along their diametrical edges by a partly cylindrical portion of said body, a longitudinally curved cover strip secured to said sides and closing the space between the curved edges of the latter from one end of said body to a location intermediate the length of said curved edges, a second cover strip closing the space between said curved edges from the other end of said body to the adjacent end of the first mentioned cover strip, and resilient means securing said second cover strip to said body for manual removal of said second cover strip from its space closing position, said second cover strip having on one end a curved flange receiving the corresponding end of said body to position said second cover strip in space closing relationship on said body.

SANTIAGO M. LUNA.

REFERENCES CITED

The following references are of record in the file of this patent:

UNITED STATES PATENTS

| Number | Name | Date |
| --- | --- | --- |
| 144,151 | Smith | Oct. 28, 1873 |
| 535,473 | Velie | Mar. 12, 1895 |
| 1,596,652 | Giovannetti | Aug. 17, 1926 |
| 2,506,305 | Maldonado | May 2, 1950 |
| 2,545,897 | Pompa | Mar. 20, 1951 |